March 17, 1942.  E. K. CLARK  2,276,930
OVEN HEATING SYSTEM
Filed Sept. 19, 1940  2 Sheets-Sheet 1

WITNESSES:
Leon M. Garman
H. C. Kepler

INVENTOR
Earl K. Clark.
BY
W. R. Coley
ATTORNEY

March 17, 1942.  E. K. CLARK  2,276,930
OVEN HEATING SYSTEM
Filed Sept. 19, 1940  2 Sheets-Sheet 2

WITNESSES:
Leon M. Garman
H. E. Hepler

INVENTOR
Earl K. Clark.
BY
W. R. Coley
ATTORNEY

Patented Mar. 17, 1942

2,276,930

UNITED STATES PATENT OFFICE 2,276,930

OVEN HEATING SYSTEM

Earl K. Clark, Mansfield, Ohio, assignor to Westinghouse Electric & Manufacturing Company, East Pittsburgh, Pa., a corporation of Pennsylvania Application September 19, 1940, Serial No. 357,365

2 Claims. (Cl. 219—20)

My invention relates to heating appliances and, more particularly, to control means for regulating the operation of the oven of an electric range.

An object of my invention is to provide means for adjustably controlling the temperature of the oven having an additional means associated therewith for applying an additional wattage to the oven during the initial heating of such oven.

Another object of my invention is to provide an oven heating system having a plurality of baking elements and a broiling element, such broiling element being independently energizable and having thermostatic means associated therewith for deenergizing the broiling element after the completion of the first heating cycle of the baking elements.

A further object of my invention is to provide heating means for a range oven which will supply an additional quantity of heat to the oven upon the initial heating thereof and which, after such oven has reached a predetermined temperature, will automatically deenergize the additional heat supply, enabling the oven to operate thereafter in a normal manner.

Other objects of my invention will either be pointed out specifically in the course of the following description of a device embodying my invention, or will be apparent from such description.

Figure 1:
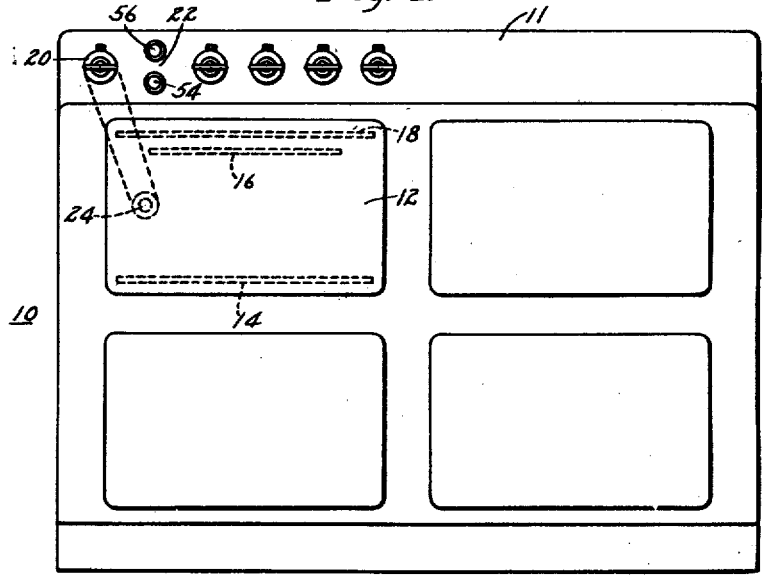
Figure 1 is a front elevational view of a range embodying my invention.

Referring to the accompanying drawings, in which like reference characters indicate like parts in the several figures, I show a range structure 10 having an oven 12 therein, a plurality of baking elements 14 and 16 and a broiling element 18 positioned within the oven to supply heat thereto, and suitably controlling mechanisms therefor comprising a thermostatic switch control knob 20 and a suitable snap switch mechanism 22.

The range structure 10 having the oven located therein, illustrated in Fig. 1, may be of any desired form. The oven 10 is, in this instance, located substantially below the devices 20 and 22, which are positioned in the backsplasher 11 in the range structure 10, in accordance with a well known practice. The thermostatic switch knob 20 is, in this instance, mechanically connected to a suitable thermostatic structure 24 positioned within the oven and responsive to temperatures thereof. The thermostatic structure 24 is adapted to control the energization and deenergization of the baking elements 14 and 16 and to control the deenergization of the broiling element 18 upon the conclusion of the initial heating or preheating operation, as hereinafter described.

The heating elements 14, 16 and 18 are positioned within the oven 12 and may be electrically connected to a suitable power supply 26 in a well known manner. The baking heating elements comprise two in this instance, namely a lower element 14 positioned slightly above the lower surface of the oven 12 and an upper heating element 16 positioned relatively close to the top surface of the oven 12. In addition, the broiling element 18 likewise may be connected to the power supply 26 in any suitable manner and is positioned within the top portion of the oven 12 relatively close to the upper baking element 16.

The thermostatic switch knob 20 is, in this instance, associated with a line switch mechanism 28 which comprises an elongated shaft 30, a plurality of cams 32, contacts 34 movable by the respective cams 32, and a suitable cam plate 36 mounted for adjustably actuating the bimetallic element of the thermostat structure 24. The thermostatic switch knob 20, when in an off position maintains the thermostatic structure 24, in this instance, in its highest temperature or contact-engaged position. The movable contacts 34 are adapted to engage suitable stationary contacts 38 when the thermostatic switch knob 20 is moved from the "off" to any "on" or operating position. Such action connects the power supply 26 to the baking elements 14 and 16 by means of main leads 40 through thermostatic contacts 25, contacts 34 and 38 and leads 44 and 46. The baking elements thus operate in a well known manner furnishing suitable baking heat to the oven 12, and thermostatic structure 24, being positioned within the oven 12 to be responsive to the temperatures thereof, maintains the oven at any desired temperature determined by the adjustment of the thermostatic switch knob 20.

The broiling element 18 is energizable through the thermostatic contacts 25 independently of the energization of the baking elements through line switches 34 and 38. However, the broiling element 18 is controlled by means of the manually operable switch 22.

The manually operable switch 22 is, in this instance, adapted to connect the broiling element 18 to the power supply 26 by means of suitable bridging contacts 52. It will be noted that such broiling element may be either energized or deenergized by means of the broiling switch 22 pressing upon the "on" button 54 or the "off" button 56, respectively.

The manually operable switch 22 comprises, in this instance, a plurality of push buttons 54 and 56, a hingeable arm 64 joining such buttons, and a second latching arm 66 operatively associated with the "on" button 54 and engageable with a latch member 68. The arm 66 is associated with the button 54 so that as such button is moved into a closed or operated position, the lower end of such arm will be positioned over the shoulder 70 on the latching member 68 (see Figs. 3, 4 and 5). When the arm 66 is engaged behind shoulder 70 of latching member 68, the bridging contacts 52 are engaged so as to connect the broiling element 18 to the power supply. Leads 60 and 62 connected to the contacts 52 and broiling element 18, respectively, are connected to a U-shaped bimetallic hairpin element 65 so that upon the passage of current therethrough such element will flex upwardly (see Figs. 3 and 5).

A hinged finger member 74 is hinged to the bimetallic member 65 so as to engage the tripping member 68 and to be hingeably movable with respect to the end of element 65. As the bimetallic element 65 flexes upwardly with passage of current therethrough, the finger 74 moves with respect to the bimetallic element 65, permitting such finger 74 to slip above the latch member 68 (see Fig. 5). Then as the bimetallic element 65 cools such finger 74 is lowered down upon the tripping member 68 and, since such finger is prevented from rotating in a clockwise direction with respect to member 65, the tripping member 68 is moved downwardly with the bimetallic element 65 as it continues to cool. With a repeated movement thereof, such member will cause the tripping member 68 to be rotated in a clockwise direction, releasing the arm 66 and permitting the spring 67 attached thereto to pull the arm in a clockwise direction and force the contacts 52 into an open or disengaged position.

Figure 5:
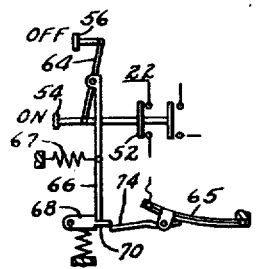

Should it be desired to manually disengage the contact 52, the "off" button 56 need only be pushed whereupon, the hinged arm 64 will move the "on" contact outward and disengage the contacts 52 (see Fig. 5).

Figure 2:
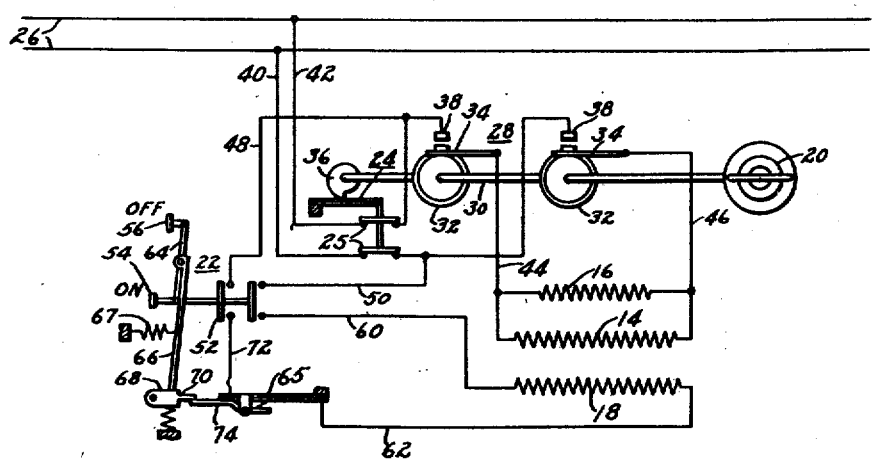
Fig. 2 is a schematic wiring diagram illustrating the preferred heating arrangement for the oven of the range shown in Fig. 1.

As illustrated in Fig. 2, the manually operable switch structure 22 is in an inoperative position. With the switch structure in such a position, the baking elements 14 and 16 operate in a normal well known manner. However, if it be desired to energize the broiling element 18, the "on" switch 54 must be pushed in so that the bridging contacts 52 will connect the broiling element 18 through conductors 60 and 62, bimetallic element 65 and conductor 72, said bridging contacts 52, conductors 48 and 50, contacts 25, and conductors 40 and 42 to power supply 26. The broiling element will thus function in a well known manner.

It will also be noted that on the first or "off" position of the cam structures 32, the baking elements 14 and 16 will not be connected to the power supply 26 while the broiling elements are connected to the power supply through the switch structure 22. In this position, it is obvious that the broiling element will function in a normal well known manner.

If it should be desired to have the broiling element 18 function simultaneously with the baking elements 14 and 16 to furnish an additional quantity of heat to the oven to provide a so-called "preheat" to cut down the length of time required for bringing the temperature of the oven from its normal cold or room temperature to the selected operating temperature, the thermostatic switch 28 is rotated to the desired temperature at which the oven is to operate and the manually operable switch structure 22 is operated so that the bridging contacts 52 will connect element 18 to the power supply. The flow of current through the broiling element will thus be from the power supply 26 through leads 40 and 42, contacts 25, leads 48 and 50, the manually operated bridging contacts 52 and to the broiling element by means of leads 60 and 72, bimetallic element 65 and lead 62.

However, it will be noted that the bimetallic element 65 is located in series with the lead 62 and, therefore, all the current passing through the broiling element 18 passes through such thermostatic member. This thermostatic member functions as a tripping member for automatically operating the switch 22 to disengage the contacts 52 as hereinabove described.

When it is desired to operate the broiling element 18 with the baking elements 14 and 16 to produce a preheating arrangement, say, during the initial heating cycle of the oven, the thermostatic switch mechanism 28 is moved to a closed or contact engaged position. This action connects the baking elements 14 and 16 to the power supply, as hereinabove described. The operator then merely pushes the "on" button 54 in to connect the broiling element 18 to the power supply 26, as hereinabove described. The combined heat produced by elements 14, 16 and 18 thus heat the oven in a very short time. The thermostat structure 24 then flexes to an "off" position, disengaging the contacts 25, deenergizing the baking elements 14 and 16 and the broiling element 18.

Inasmuch as the broiling element 18 is deenergized, the passage of current flowing therethrough ceases. Then the bimetallic member 65, connected in series with the broiler element, thus cools, flexing in a counterclockwise direction so that the finger 74 attached thereto operates the tripping member 68 to permit the resilient member 67 to disengage the bridging contacts 52, as hereinabove described.

Accordingly, it is obvious that the broiling element 18 is disconnected from the power supply 26 and, therefore, deenergized by the manually operable switch 22. However, it will be understood that the thermostatic switch mechanism 24 first deenergizes the broiling element, whereupon the manually operable switch mechanism 22 disconnects the element from the power supply automatically through the application of the bimetallic member 65.

It is, therefore, obvious that I have provided a switching mechanism for an oven which is adapted to provide additional power to the oven during the initial heating cycle thereof and which, upon the deenergization of such heating elements by the thermostatic switch thermally associated with the oven, automatically disconnects the broiling element from the power supply through the manually operable switch mechanism 22, permitting the baking elements 14 and 16 to operate and cycle in a well known manner.

Figure 3:
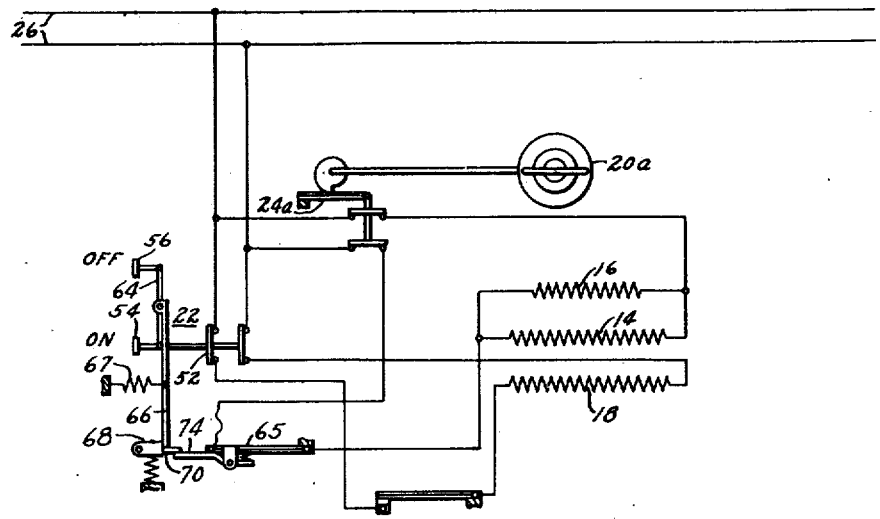
Fig. 3 shows a modification of Fig. 2.
Figure 4:
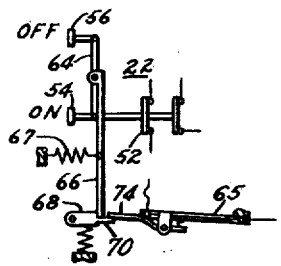
Figs. 4 and 5 illustrate various operative positions of a portion of the device embodying my invention.

As a modification of the circuit illustrated in Fig. 2 and hereinabove described, I show a modified arrangement in Fig. 3, in which the thermostatic member 65 associated with the manually operable switch mechanism 22 is connected in series with the baking elements 14 and 16. In this modification, it will be noted that there is no separate main line switch which is used to disconnect the baking elements from the power supply. However, the manually operable switch mechanism 22 is adapted to directly connect the broiling element 18 to the power supply 26 independently of the thermostatic structure 24a. The thermostatic structure 24a through the operating knob 20a is adapted to directly connect the baking elements 14 and 16 to the power supply 26 and to selectively determine the operating temperatures thereof. With such an arrangement, it is obvious that the operating principles of the heating elements 14, 16 and 18 will be substantially as hereinabove described. Further, that the thermostat switch mechanism 24a at the conclusion of the initial heating cycle deenergizes both the baking and broiling elements from the power supply. However, it will be noted that the broiling element 18 is deenergized from the power supply not directly through thermostatic switch mechanism 24a but due to the interruption of current passing through the elements 14 and 16 and bimetallic member 65 of switch mechanism 22. This action, in turn, permits the bimetallic element 65 to rotate in a counterclockwise direction and to disengage the contact bridging mechanism 52 of the switch mechanism 22, in a manner hereinabove described.

The broiler element 18 is thus disconnected from the power supply 26 and as the thermostatic device 24a becomes reengaged, the baking elements 14 and 16 are reenergized while the broiling element 18 remains deenergized due to the tripping of bimetallic element 65 of the switch mechanism 22. The baking elements thus continue to function in a well known manner through the thermostatic device 24a.

Various other modifications may be made in the device embodying my invention without departing from the spirit and scope thereof, and I desire, therefore, that only such limitations shall be placed thereon as are imposed by the prior art and set forth in the appended claims.

I claim as my invention:

1. An electric heating system for an oven comprising a first heating element and a second heating element respectively connected to a power source alone for baking and for broiling purposes and connected to said source jointly for preheating purposes only, a first thermostat for controlling the circuits of both of said heating elements, a switch biased to the open position and when closed connecting said second heating element in circuit, a second thermostat in circuit with said second heating element only, and means for holding said switch in its closed position in opposition to its biasing force, said second thermostat in the cooling portion of its cycle, when said first thermostat opens to deenergize both of said heating elements during the joint or preheating connection thereof, actuating said holding means whereby said switch is operated by its biasing force to open position.

2. An electric heating system for an oven comprising a first heating element and a second heating element respectively connected to a power source alone for baking and for broiling purposes and connected to said source jointly for preheating purposes only, a first thermostat for controlling the circuits of both of said heating elements, a switch for connecting said second heating element in circuit, a spring for normally holding said switch in open position, a second thermostat in circuit with said second heating element only, and means for holding said switch in its closed position in opposition to said spring, said second thermostat in the cooling portion of its cycle, when said first thermostat opens to deenergize both of said heating elements during the joint or preheating connection thereof, actuating said holding means whereby said switch is operated by said spring to open position.

EARL K. CLARK.